United States Patent
Picard

(10) Patent No.: US 9,336,425 B2
(45) Date of Patent: May 10, 2016

(54) METHOD FOR SEGMENTING FINGERS

(71) Applicant: MORPHO, Issy-les-Moulineaux (FR)

(72) Inventor: Sylvaine Picard, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/435,293

(22) PCT Filed: Oct. 16, 2013

(86) PCT No.: PCT/EP2013/071655
§ 371 (c)(1),
(2) Date: Apr. 13, 2015

(87) PCT Pub. No.: WO2014/060490
PCT Pub. Date: Apr. 24, 2014

(65) Prior Publication Data
US 2015/0294133 A1 Oct. 15, 2015

(30) Foreign Application Priority Data

Oct. 18, 2012 (FR) ...................................... 12 59925

(51) Int. Cl.
*G06T 7/00* (2006.01)
*G06K 9/00* (2006.01)

(52) U.S. Cl.
CPC ........ *G06K 9/00033* (2013.01); *G06K 9/00375* (2013.01); *G06T 7/0087* (2013.01); *G06T 2207/20076* (2013.01); *G06T 2207/30196* (2013.01)

(58) Field of Classification Search
None
See application file for complete search history.

(56) References Cited

U.S. PATENT DOCUMENTS 7,912,250 B2 * 3/2011 Fourre ............... G06K 9/00033
382/115
2009/0208070 A1 8/2009 Fourre et al.

FOREIGN PATENT DOCUMENTS

FR 2927713 A1 8/2009

OTHER PUBLICATIONS

Personal Authentication Using 3-D Finger Geometry. Sotiris Malassiotis, Niki Aifanti, and Michael G. Strintzis. 2006.*
Nov. 13, 2013 Search Report issued in International Application No. PCT/EP2013/071655.
Malassiotis et al; "Personal Authentication Using 3-D Finger Geometry;" IEEE Transactions on Information Forensics and Security; Mar. 2006; vol. 1; No. 1; XP007910483; pp. 12-21.

(Continued)

*Primary Examiner* — Stephen R Koziol
*Assistant Examiner* — Delomia L Gilliard
(74) *Attorney, Agent, or Firm* — Oliff PLC; R. Brian Drozd

(57) ABSTRACT

A method for segmenting fingers may include: a capture step during which the acquisition device captures an image of the fingers and of the sight; a computing step during which the processing unit computes the unrolled phase image from the image of the thus captured; a derivation step during which, for each pixel of the phase image thus computed, the processing unit computes the derivative of the phase along the isointensity axis of the sight; a regionalisation step during which the processing unit associates each pixel where the derivative of the phase has been computed with a region grouping all the adjoining pixels step by step where the derivative of the phase has the same polarity; and a recognition step during which the location of each finger is recognised from the analysis of the regions thus determined.

3 Claims, 3 Drawing Sheets

(56) References Cited

OTHER PUBLICATIONS

Figure 4A:
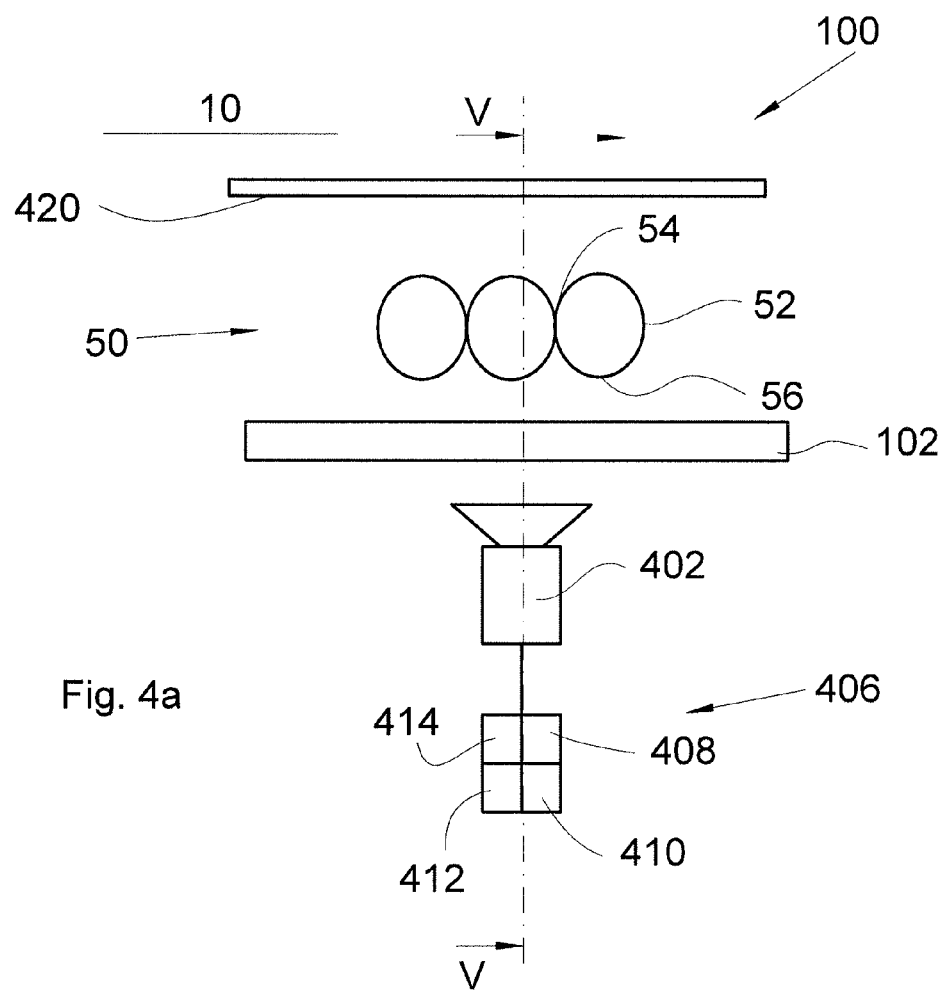

Chen et al; 3D Touchless Fingerprints: Compatibility with Legacy Rolled Images; Biometric Cosortium Conference; 2006; XP031141444; pp. 1-6.
Bennanoun et al; "Object Recognition: Fundamentals and Case Studies;" Jan. 1, 2002; XP002696047; 2 pp.
Javidi; Image Recognition and Classification; Jan. 1, 2002; XP002696048; 3 pp.
Takeda et al; "Fourier Transform Profilometry for the Automatic Measurement of 3-D Object Shapes;" Applied Optics; 1983; vol. 22; No. 24; XP002453661; pp. 3977-3982.
Su et al; "Fourier Transform Profilometry: A Review;" Optics and Lasers in Engineering; 2001; vol. 35; XP008161675; pp. 263-284.

* cited by examiner

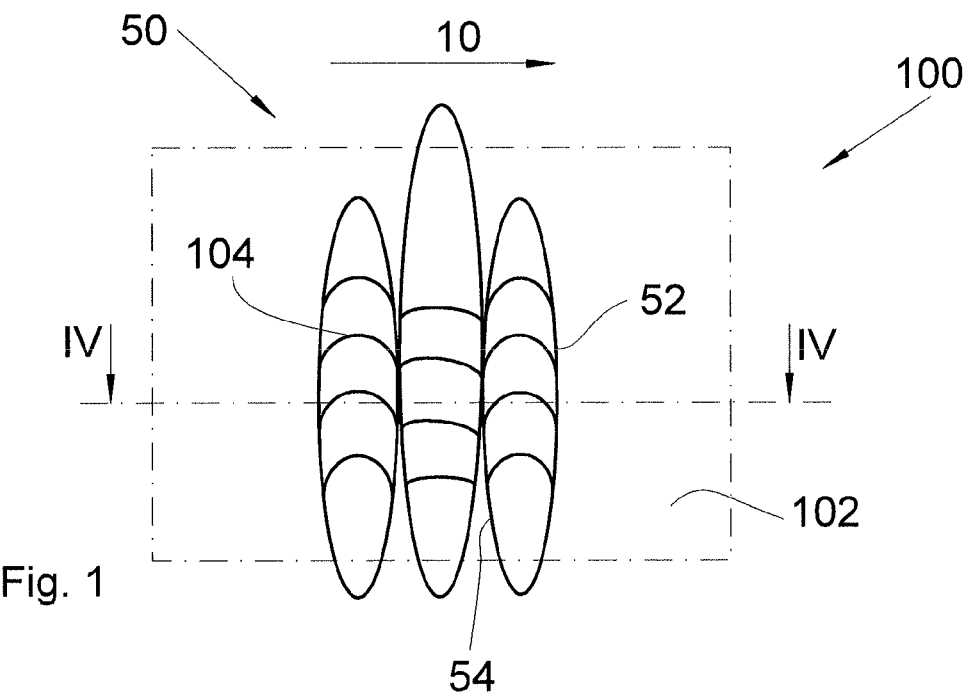
Fig. 1
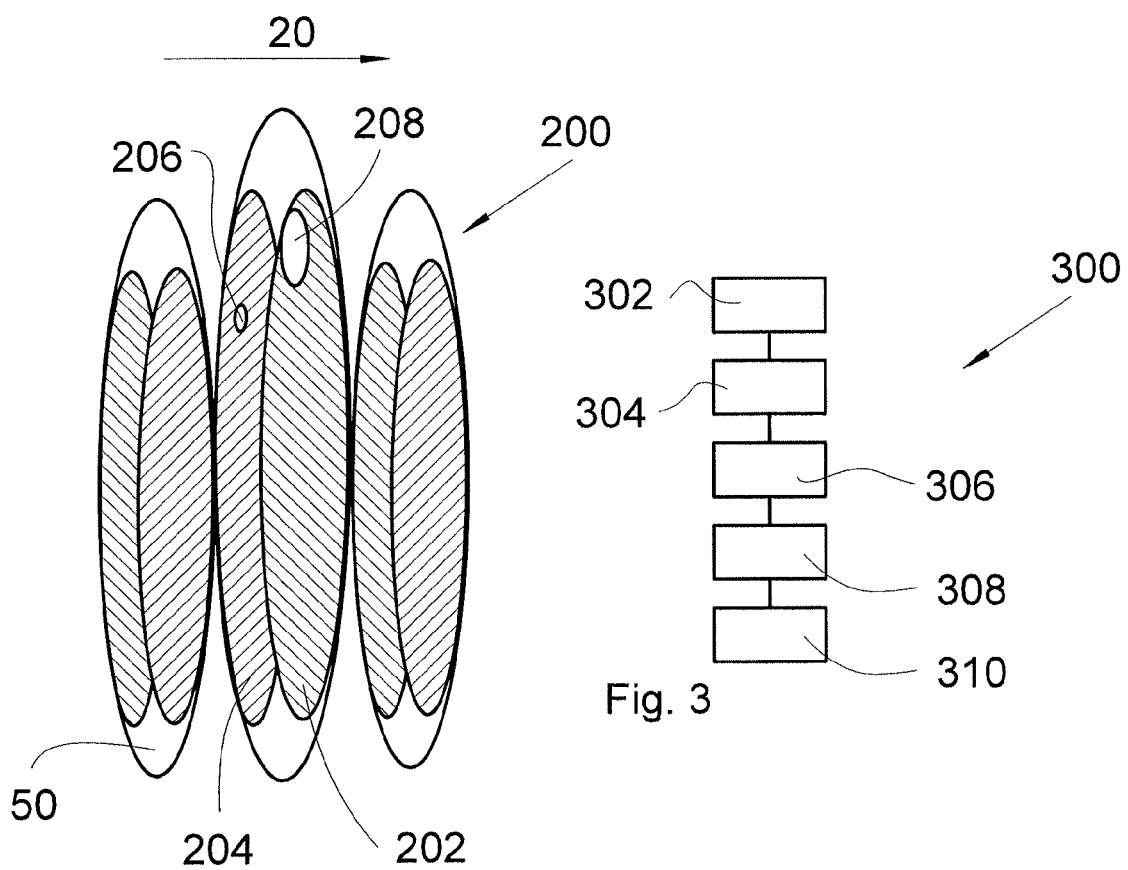
Fig. 2
Fig. 3

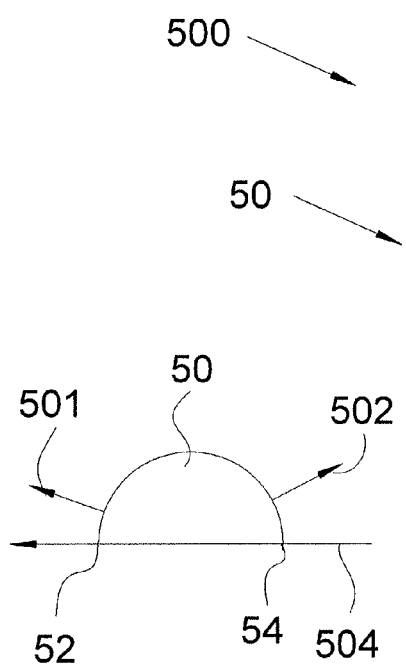
Fig. 5b
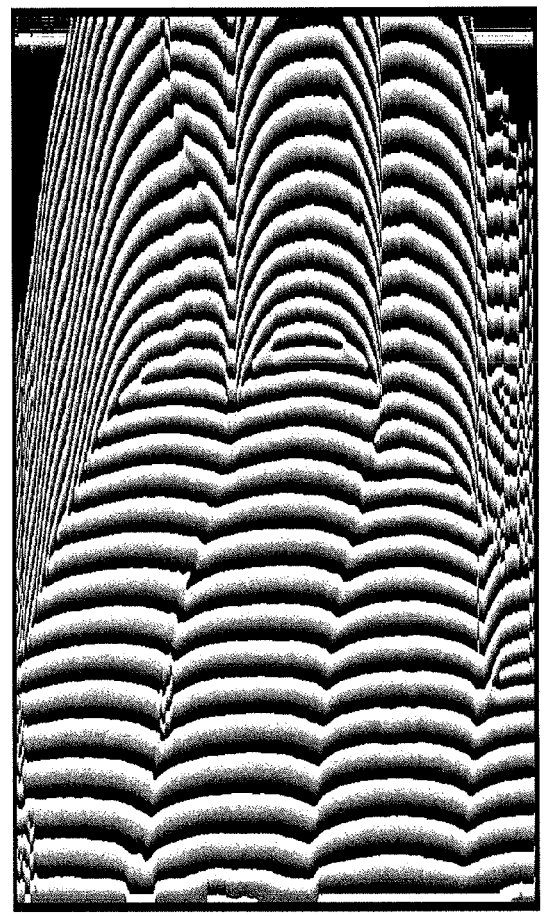
Fig. 5a
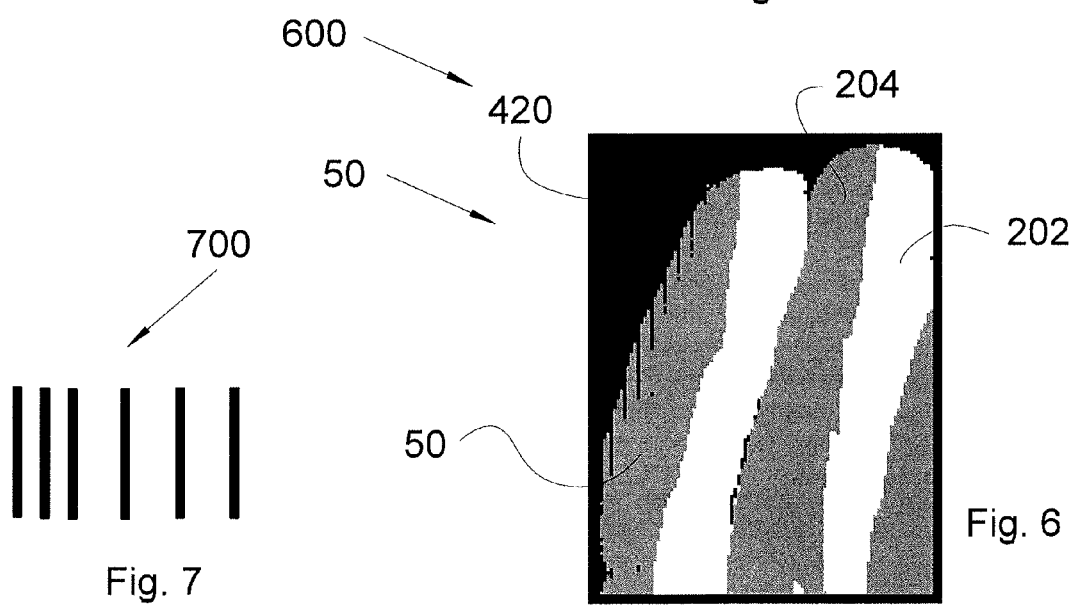
Fig. 7
Fig. 6

METHOD FOR SEGMENTING FINGERS

The present invention concerns a method for segmenting fingers during the capture of images on the fly, as well as a segmentation device implementing such a method. It finds an application in the field of the recognition of an individual through his prints and in particular through his fingerprints.

An image of the fingerprint of an individual can be captured with contact or without contact. When the capture takes place with contact, the individual places his finger on a window behind which there is disposed an acquisition device that captures the image of the fingerprint.

When the capture takes place without contact, the individual passes his fingers in front of a window, behind which an acquisition device captures one or more images of the fingers as they pass. From this image or these images, the image of the fingerprint of the individual is then extracted.

Such a method and the corresponding device are described in the document FR-A-2 927 713.

According to various parameters, such as for example the speed of passage of the fingers, it may happen that it is difficult to capture the image of the fingerprint since the location of the fingerprint on the captured image is not clearly defined.

One object of the present invention is to propose a method for segmenting the fingers passing without contact in front of an acquisition device. This segmentation method makes it possible to segment the fingers that are on the captured image and therefore to discern the region where a print is actually situated. The segmentation method according to the invention therefore does not have the drawbacks of the prior art and, in particular, makes it possible to locate the positions of the fingers and fingerprints precisely.

To this end, a finger segmentation method is proposed, said segmentation method being implemented by a segmentation device comprising a processing unit, an acquisition device intended to capture an image of said fingers when they pass in front of said acquisition device in a direction of advancement and a projection device intended to project a sight having an isointensity axis on said fingers, said segmentation method comprising:
- a capture step during which the acquisition device captures an image of the fingers and of the sight,
- a computing step during which the processing unit computes the unrolled phase image from the image of the sight thus captured,
- a derivation step during which, for each pixel of the phase image thus computed, the processing unit computes the derivative of the phase along the isointensity axis of the sight, and
- a regionalisation step during which the processing unit associates each pixel where the derivative of the phase has been computed with a region grouping all the adjoining pixels step by step where the derivative of the phase has the same polarity, and
- a recognition step during which the location of each finger is recognised from the analysis of the regions thus determined.

Advantageously, the regionalisation step consists of:
- an initialisation step during which a first pixel where the derivative of the phase has been computed is chosen,
- a creation step during which a region having the polarity of the derivative of said first pixel is created,
- for each pixel related to said first pixel,
- a step of comparing the polarity of the derivative of the phase of said related pixel with respect to the polarity of the derivative of the phase of said first pixel,
- a positive-grouping step during which said related pixel is grouped in the region including said first pixel when the result of the comparison step is positive,
- when each pixel related to said first pixel has thus been processed,
- a designation step during which one of said related pixels is designated as the first pixel,
- a first looping step during which the process is looped onto the comparison step so as thus step by step to progress and cover the whole of the image, and
- when all the pixels adjacent step by step and having a derivative of the phase with the same polarity as the derivative of the phase of said first pixels have been processed,
- a choosing step during which a pixel not yet processed is chosen as the first pixel, and
- a second looping step during which the process loops onto the creation step.

Advantageously, a segmentation method comprises, just after the regionalisation step and before the recognition step:
- a marking step during which each region having a polarity and included in another region with the same polarity is marked, for each region thus marked
- a measuring step during which the surface area of said region is computed,
- a deletion step during which said region thus marked is deleted if its surface area is below a threshold and during which the region in which said region thus marked is included absorbs said region thus marked.

The invention also proposes a finger segmentation device comprising:
- a projection device intended to project a sight having an isointensity axis on said fingers,
- an acquisition device intended to capture an image of said fingers and of the sight thus projected when the fingers pass in front of said acquisition device in an advancement direction, and
- a processing unit comprising:
- computing means intended to compute the unrolled phase image from the image of the sight captured,
- derivation means intended to compute, for each pixel of the phase image, the derivative of the phase along the isointensity axis,
- regionalisation means intended to associate each pixel with a region grouping together all the adjacent pixels step by step where the derivative of the phase has the same polarity, and
- recognition means intended to locate each finger by analysing the regions.

Figure 4B:
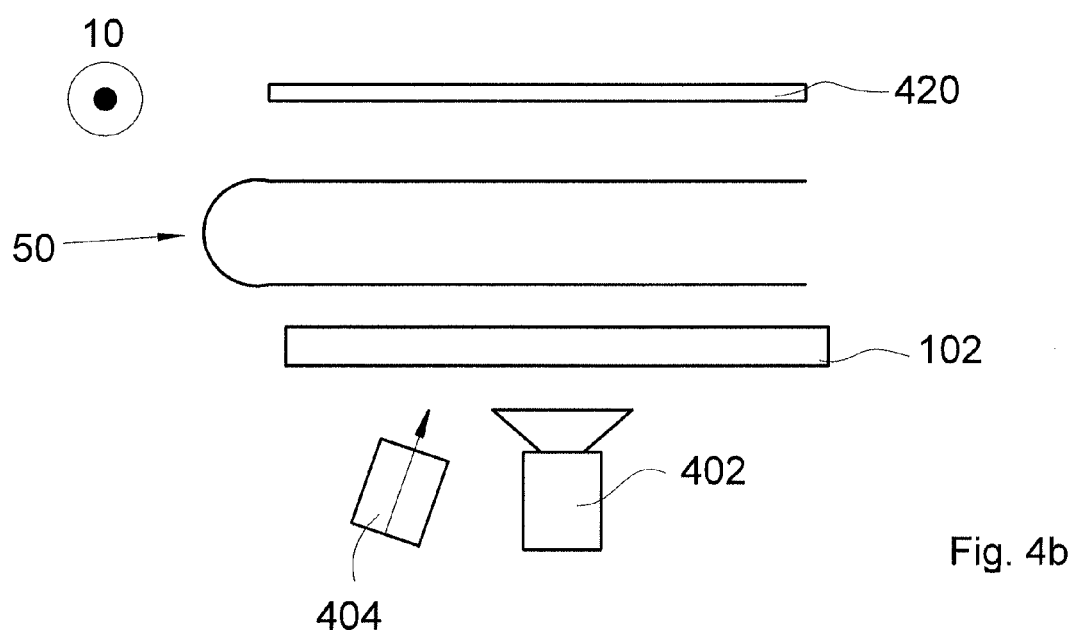

The features of the invention mentioned above, as well as others, will emerge more clearly from a reading of the following description of an example embodiment, said description being given in relation to the accompanying drawings, among which:

FIG. 1 is a schematic view of the passage of fingers in front of an acquisition device, FIG. 2 is an image showing the regionalisation of the fingers, FIG. 3 is an algorithm of the segmentation method according to the invention, FIG. 4a is a view in cross section along the line IV-IV in FIG. 1, FIG. 4b is a view in cross section along the line V-V in FIG. 4a, FIG. 5a is a phase image of fingers, FIG. 5b is a schematic representation of vectors derived from the phase image on a finger, FIG. 6 is an image resulting from an intermediate step of the segmentation method, and FIG. 7 shows an example of a sight consisting of unevenly spaced lines.

FIG. 1 is a schematic representation of a segmentation device 100, FIG. 4a is a cross section along the line IV-IV in FIG. 1 and FIG. 4b is a cross section along the line V-V in FIG. 4a. The segmentation device 100 comprises a window 102 facing which a capture space is defined. The individual wishing to be identified passes his fingers 50 in front of the window 102 in an advancement direction represented by the arrow 10. At the rear of the window 102 an acquisition device is disposed (402, FIG. 4a-b), for example of the CCD type, and a projection device (404, FIG. 4b) intended to project a sight 104. In the embodiment of the invention presented here, the projection device 404 is placed in line with the acquisition device 402 along a plane perpendicular to the advancement direction 10.

The acquisition device 402 and the projection device 404 are elements of the segmentation device 100.

The acquisition device 402 is intended to capture at least one image but preferably a plurality of successive images of the fingers 50 and of the sight 104 projected onto the fingers 50. The acquisition device 402 has a sensor having sufficient acquisition speed to capture at least one image of the moving fingers 50.

In the advancement direction 10, each finger 50 has a leading edge 52 and a trailing edge 54 that delimits the finger 50 with respect to the void or the adjacent finger 50. Each finger 50 (see FIG. 5b) has a curved shape between the leading edge 52 and the trailing edge 54. As can be seen better in FIG. 4a, the surface of the finger 50 approaches the acquisition device 402 between the leading edge 52 and an extreme region 56 and moves away from the acquisition device 402 between the extreme region 56 and the trailing edge 54. The extreme region 56 is the part of the finger 50 closest to the window 102.

The projection device 404 projects the sight 104, which is superimposed on the fingers 50 and the image of which is captured at the same time as the image of the fingers 50.

The sight 104 is for example a sinusoidal sight or a square sight. The isointensity lines of the sight 104 are here roughly oriented parallel to the advancement direction 10, as can be seen in FIG. 1. The frequency of the sight 104 is chosen so as to be very much greater than the frequency of the ridges on the skin. It is around 45 pixels at approximately 600 DPI.

To facilitate the distinction between the fingers 50 and the sight 104, the sight 104 comprises three colours (R, G, B) with uniform illumination in one of the three colours and repetitive light patterns in at least one of the other two colours. Preferably, the uniform lighting is in green and the repetitive light patterns are in red and/or blue. In a variant, the segmentation device 100 can use a uniform lighting device in one colour, and a projection device 404 in one or more other colours.

The acquisition device 402 is suitable for extracting an image representing the sight 104 in order to transmit it to a processing unit 406 of the segmentation device 100 that is preferably in the form of a computer.

The sight 104 projected onto the fingers 50 appears deformed on the images captured by the acquisition device 402.

After capture, the image of the fingers 50 and of the sight 104 is processed by the processing unit 406.

An unrolled phase image is computed from the image of the deformed sight 104 seen on the captured image.

FIG. 5a shows an example of a phase image 500 for a set of three fingers 50 illuminated by a sinusoidal sight 104. The phase changes polarity along the fingers 50, passing from one period of the sight 104 to another. These breaks form a high variation in the levels of grey in these regions of the image and make it possible to calculate a derivative of the phase that is reliable in these regions.

FIG. 5b depicts schematically two derived vectors 501 and 502 of the phase at two points of a finger 50. Because of the curved tubular shape of the finger 50, the basic image is also curved. According to the orientation of the derived vector 501, 502, this curvature causes a change in sign of the projection of the derived vector 501, 502 on a projection axis 504 perpendicular to the longitudinal axis of the finger. The projection axis 504 is the isointensity axis of the sight 104, which is here parallel to the advancement direction 10 and oriented in the same direction.

These changes in polarity constitute phase jumps.

For each pixel of the phase image thus computed, the derivative of the phase along the isointensity axis of the sight 104 is computed, that is to say, in the embodiment of the invention presented here, in the advancement direction 10.

Each pixel where the derivative of the phase has been computed is associated with a continuous region grouping together all the pixels that are adjacent step by step and where the derivative of the phase has the same polarity. The image therefore generally has several "positive" regions where the derivative of the phase is positive and several "negative" regions where the derivative of the phase is negative. A region is formed by the grouping of all the pixels having a derivative of the phase with the same polarity and which is delimited by transition zones. Each transition zone is formed by the boundary between the region in question and one or more regions grouping together pixels having a derivative of the phase of reverse polarity and/or by the boundary between the region in question and the limits between the outside and the finger 50, that is to say the leading edge 52 and the trailing edge 54.

FIG. 2 shows an image 200 of the fingers 50 on which a positive region 202 and a negative region 204 are shown for each finger. The position of the positive region 202 and the position of the negative region 204 are, in FIG. 2, arbitrary and may be reversed according to the conventions chosen.

In the embodiment chosen, partly explained below, each finger 50 has successively a negative region 204 and then a positive region 202.

FIG. 6 shows an image 600 of two fingers 50, each having a positive region 202 and a negative region 204.

FIG. 3 is an algorithm of a segmentation method 300 according to the invention.

The segmentation method 300 comprises:
  a capture step 302 during which an image of the fingers 50 and of the sight 104 is captured by the acquisition device 402,
  a computing step 304 during which the unrolled phase image is computed from the image of the sight 104 thus captured,
  a derivation step 406 during which, for each pixel of the phase image thus computed, the derivative of the phase along the isointensity axis of the sight 104 is computed,
  a regionalisation step 308 during which each pixel where the derivative of the phase has been computed is associated with a region 202, 204 grouping together all the adjacent pixels from place to place where the derivative of the phase has the same polarity, and
  a recognition step 310 during which the location of each finger 50 is recognised from the analysis of the regions 202 and 204 determined by the regionalisation step 308.

From the image issuing from the recognition step 310, the processing unit 406 can locate the place where the image of the print to be identified is situated, that is to say at the distal end of each finger 50 thus located.

The image of the print can then be transmitted to an identification system in order to make a comparison with the prints in a database.

Furthermore, the segmentation method 300 thus described is robust since in particular it makes it possible to segment the fingers 50 whether they be separated or close together. The segmentation method 300 is also rapid and, in order to increase the speed of obtaining of the results, it is also possible to sub-sample the captured image. It is also possible to segment each image independently.

The recognition step 310 consists of determining the transition zones between two consecutive fingers 50 or between a finger 50 and the outside.

The recognition step 310 will more precisely be described from FIG. 2, which shows an image 200 of the regions 202 and 204 obtained at the end of the regionalisation step 308.

The recognition step consists of a travel step during which each image 200 is travelled through in a travel direction 20 parallel to the isointensity axis of the sight 104, a delimitation step during which the transition zones corresponding to the boundaries between two regions 202 and 204 having derivatives of the phase with different polarities or at the boundaries between the background and a region 202, 204 are sought and a grouping step during which the regions 202 and 204 that are liable to belong to the same finger 50 are grouped together in order to constitute a representation of the finger 50 and to allow localisation of the print at its distal end.

The grouping step consists of grouping two adjacent regions 202 and 204 having derivatives of the phase of different polarities, watching out for the polarity and travel direction 20. For example, in FIG. 2, the image 200 has successively, in the direction of travel 20, a transition zone between the background and a first negative region 204, a transition zone between the first negative region 204 and a first positive region 202, a transition zone between the first positive region 202 and a second negative region 204, a transition zone between the second negative region 204 and a second positive region 202, a transition zone between the second positive region 202 and a third negative region 204, a transition zone between the third negative region 204 and a third positive region 202, and a transition zone between the third positive region 202 and the background.

From the conventions in the example in FIG. 2, a finger 50 is considered to consist of a negative region 204 followed by a positive region 202. According to the conventions envisaged here, the grouping step consists of defining a first finger 50 by grouping the first negative region 204 and the first positive region 202, a second finger 50 by grouping the second negative region 204 and the second positive region 202, and a third finger 50 by grouping the third negative region 204 and the third positive region 202.

Naturally, according to the image 200, it is possible for certain regions 202, 204 to be missing or poorly delimited, such as for example in FIG. 6.

In FIG. 6, the left-hand finger 50 is perfectly defined, on the left, by the transition zone between the background and its negative region 204, and on the right by the transition zone between its positive region 202 and the negative region 204 of the adjoining finger.

On the other hand, said adjoining finger 50 is perfectly delimited on the left by the transition zone between its negative regions 204 and the positive region 202 of the left-hand finger 50, but the transition zone on the right consists of a transition zone with the background (the top part) and a transition zone with a right-hand finger 50 (at the bottom).

The right-hand finger 50 is incompletely delimited since only part of the negative region 204 is visible. The transition zone on the right here corresponds to the transition zone with the background.

The examples shown here present fingers 50 that are close together. However, it is possible for some fingers 50 to be separated from one another. The transition zones will then be different since there will be transition zones with the background at the middle of the image, but each finger 50 will all the same consist of a negative region 204 followed by a positive region 202 according to the conventions chosen here.

A transition zone between the background and a region 202, 204 is determined for example by difference in contrast with the background 420.

In order to implement the segmentation method 300, the processing unit 406 comprises:
computing means 408 intended to compute the unrolled phase image from the image of the sight 104 captured,
derivation means 410 intended to compute, for each pixel of the phase image, the derivative of the phase along the isointensity axis of the sight 104,
regionalisation means 412 intended to associate each pixel with a region grouping all the adjacent pixels step by step where the derivative of the phase has the same polarity, and
recognition means 414 intended to locate each finger 50 by analysing the regions 202 and 204.

The regionalisation step 308 advantageously consists of:
an initialisation step during which a first pixel where the derivative of the phase has been computed is chosen,
a creation step during which a region having the polarity of the derivative of said first pixel is created,
for each pixel related to said first pixel,
a step of comparing the polarity of the derivative of the phase of said related pixel with respect to the polarity of the derivative of the phase of said first pixel,
a positive grouping step during which said related pixel is grouped in the region including said first pixel when the result of the comparison step is positive, that is to say when the derivative of the phase of said related pixel and the derivative of the phase of said first pixel have the same polarity,
when each pixel related to said first pixel has been thus processed,
a designation step during which one of said related pixels is designated as the first pixel,
a first looping step during which the processed loops onto the comparison steps so as thus to progress step by step and to cover the whole of the image, and
when all the adjacent pixels step by step having a derivative of the phase with the same polarity as the derivative of the phase of said pixels have been processed,
a choosing step during which a pixel that has not yet been processed is chosen as the first pixel, and
a second looping step during which the processed loops onto the creation step.

At the end of the regionalisation step 308, there appear large regions 202 and 204 and small regions 206 and 208 that are included in the large regions 202 and 204 but having reversed polarities. These small regions 206 and 208 are due to the random nature of the segmentation.

The processing of these small regions 206 and 208 may take the form of a deletion of said region 206, 208 when its surface area is below a threshold. For example, the region 206 will be deleted and the region 204 will absorb this surface and take the polarity of the corresponding large region 204.

The processing of these small regions 206 and 208 may take the form of a merger of said region 206, 208 with one of the large regions 202 or 204 when its surface area is above said threshold. For example, the region 208 will be merged with the region 204.

The processing takes place just after the regionalisation step 308 and before the recognition step 310. The processing is carried out by the processing unit, which comprises the appropriate means, and the processing may consist of:
- a marking step during which each region 206, 208 having a polarity and included in another region 202, 204 with the reverse polarity is marked, for each region 206, 208 thus marked
- a measuring step during which the surface area of said region 206, 208 is computed,
- a deletion step during which said region 206 thus marked is deleted if its surface area is below a threshold, and during which the region 204 in which said region 206 thus marked is included absorbs said region 206 thus marked,
- a merger step during which said region 208 thus marked is merged with the region 204 in which said region 206 thus marked is not included.

The above description is based particularly on an image of the fingers 50, and this embodiment is particularly suited when the image thus captured makes it possible to visualise all the fingers 50 that it is necessary to have for a good identification.

However, it is possible to capture several images of the fingers 50 and to carry out segmentation for each image thus captured. It is thus possible for all the fingers 50 to be contained on two or more images.

The sight presented above may consist of a set of regularly spaced lines, but the sight may also consist of a set of lines regularly spaced in pieces. FIG. 7 shows an example of such a sight 700, that is to say periodic with frequencies that may vary locally.

Naturally the present invention is not limited to the examples and embodiments described and depicted but is capable of numerous variants accessible to persons skilled in the art.

The invention claimed is:

1. A method for segmenting fingers, said segmentation method being implemented by a segmentation device comprising a processing unit, an acquisition device intended to capture an image of said fingers when they pass in front of said acquisition device in a direction of advancement and a projection device intended to project a sight having an isointensity axis on said fingers, said segmentation method comprising:
    a capture step during which the acquisition device captures an image of the fingers and of the sight,
    a computing step during which the processing unit computes the unrolled phase image from the image of the sight thus captured,
    a derivation step during which, for each pixel of the phase image thus computed, the processing unit computes the derivative of the phase along the isointensity axis of the sight, and
    a regionalisation step during which the processing unit associates each pixel where the derivative of the phase has been computed with a region grouping all the adjoining pixels step by step where the derivative of the phase has the same polarity, and
    a recognition step during which the location of each finger is recognised from the analysis of the regions thus determined.

2. The segmentation method according to claim 1, wherein the regionalisation step consists of:
    an initialisation step during which a first pixel where the derivative of the phase has been computed is chosen,
    a creation step during which a region having the polarity of the derivative of said first pixel is created,
    for each pixel related to said first pixel,
    a step of comparing the polarity of the derivative of the phase of said related pixel with respect to the polarity of the derivative of the phase of said first pixel,
    a positive-grouping step during which said related pixel is grouped in the region including said first pixel when the result of the comparison step is positive,
    when each pixel related to said first pixel has thus been processed,
    a designation step during which one of said related pixels is designated as the first pixel,
    a first looping step during which the process is looped onto the comparison step so as thus step by step to progress and cover the whole of the image, and
    when all the pixels adjacent step by step and having a derivative of the phase with the same polarity as the derivative of the phase of said first pixels have been processed,
    a choosing step during which a pixel not yet processed is chosen as the first pixel, and
    a second looping step during which the process loops onto the creation step.

3. A device for segmenting fingers, comprising:
    a projection device intended to project a sight having an isointensity axis on said fingers,
    an acquisition device intended to capture an image of said fingers and of the sight thus projected when the fingers pass in front of said acquisition device in an advancement direction, and
    a processing unit comprising:
    computing means intended to compute the unrolled phase image from the image of the sight captured,
    derivation means intended to compute, for each pixel of the phase image, the derivative of the phase along the isointensity axis,
    regionalisation means intended to associate each pixel with a region grouping together all the adjacent pixels step by step where the derivative of the phase has the same polarity, and
    recognition means intended to locate each finger by analysing the regions.

* * * * *